(12) United States Patent
Schuller et al.

(10) Patent No.: US 9,969,371 B2
(45) Date of Patent: May 15, 2018

(54) SLIP-CONTROLLABLE VEHICLE BRAKE SYSTEM

(71) Applicant: Robert Bosch GmbH, Stuttgart (DE)

(72) Inventors: Wolfgang Schuller, Cleebronn (DE); Goekhan Oezkan, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/305,630

(22) PCT Filed: Mar. 16, 2015

(86) PCT No.: PCT/EP2015/055399
§ 371 (c)(1),
(2) Date: Oct. 20, 2016

(87) PCT Pub. No.: WO2015/161958
PCT Pub. Date: Oct. 29, 2015

(65) Prior Publication Data
US 2017/0043754 A1 Feb. 16, 2017

(30) Foreign Application Priority Data

Apr. 22, 2014 (DE) ......................... 10 2014 207 538

(51) Int. Cl.
*B60T 13/16* (2006.01)
*B60T 8/40* (2006.01)
(Continued)

(52) U.S. Cl.
CPC .............. *B60T 8/405* (2013.01); *B60T 8/341* (2013.01); *B60T 8/4068* (2013.01);
(Continued)

(58) Field of Classification Search
CPC ........ B60T 8/405; B60T 8/341; B60T 8/4068; B60T 8/4872; B60T 2201/022; B60T 2270/10
(Continued)

(56) References Cited

U.S. PATENT DOCUMENTS 5,031,969 A * 7/1991 Siegel ..................... B60T 8/341
303/113.1
5,127,712 A * 7/1992 Rizk ..................... B60T 8/4068
137/110
(Continued)

FOREIGN PATENT DOCUMENTS

DE 10 2010 030 921 A1 8/2011
DE 10 2010 042 534 A1 4/2012

OTHER PUBLICATIONS

International Search Report corresponding to PCT Application No. PCT/EP2015/055399, dated Oct. 29, 2015 (German and English language document) (5 pages).

*Primary Examiner* — Pamela Rodriguez
(74) *Attorney, Agent, or Firm* — Maginot, Moore & Beck LLP

(57) ABSTRACT

A slip-controllable vehicle brake system includes a drivable pressure generator configured to supply at least one wheel brake of a brake circuit with pressure medium. The pressure generator has a pump inlet valve and a pump outlet valve to control the throughput of the pressure medium. Novel system functions, such as pedestrian protection, require that the pressure generator has a drive with increased power to provide high pressure medium volumes to the wheel brakes at a faster rate. In the case of ABS braking, a high braking pressure generated by the drive works against the starting of the pressure generator and increases the starting current. To ease the starting of the drive and to limit the required starting current, a mechanism is provided downstream of the pump (Continued)

outlet valve which prevents an exerting of the pressure generator on the pressure side with the pressure of the main brake cylinder.

18 Claims, 2 Drawing Sheets

(51) Int. Cl.
*B60T 8/34* (2006.01)
*B60T 8/48* (2006.01)

(52) U.S. Cl.
CPC ....... *B60T 8/4872* (2013.01); *B60T 2201/022* (2013.01); *B60T 2270/10* (2013.01)

(58) Field of Classification Search
USPC ..... 303/10, 9.62, 115.1, 115.4, 115.5, 116.2, 303/116.3
See application file for complete search history.

(56) References Cited

U.S. PATENT DOCUMENTS

| | | | |
|---|---|---|---|
| 2012/0049616 A1* | 3/2012 | Park | ................ B60T 17/04 303/9.62 |
| 2012/0091786 A1* | 4/2012 | Frueh | ................ B60T 8/4872 303/10 |
| 2013/0193748 A1 | 8/2013 | Kajita et al. | |
| 2013/0200687 A1* | 8/2013 | Guo | ................ B60T 8/4291 303/87 |
| 2015/0137587 A1* | 5/2015 | Kunz | ................ B60T 8/267 303/3 |

\* cited by examiner

SLIP-CONTROLLABLE VEHICLE BRAKE SYSTEM

This application is a 35 U.S.C. § 371 National Stage Application of PCT/EP2015/055399, filed on Mar. 16, 2015, which claims the benefit of priority to Serial No. DE 10 2014 207 538.6, filed on Apr. 22, 2014 in Germany, the disclosures of which are incorporated herein by reference in their entirety.

BACKGROUND

The disclosure relates to a vehicle brake system with wheel slip control. Such a vehicle brake system is disclosed, for example, by DE 102010042534 A1.

This known vehicle brake system comprises a hydraulic unit with a brake master cylinder connected thereto and wheel brakes likewise connected thereto. The brake master cylinder can be actuated physically by the driver of the vehicle in order to supply brake pressure to the vehicle brake system. The brake pressure is delivered to the wheel brakes and is adjusted by control devices of the hydraulic unit to the wheel slip conditions prevailing at any given instant on the vehicle wheels associated with the wheel brakes. For this purpose, so-called pressure build-up valves and pressure reduction valves, which are in each case assigned in pairs to each wheel brake, are provided on the hydraulic unit. The pressure build-up valves control a flow of fluid to the wheel brakes should an increase in brake pressure be necessary, whilst the pressure reduction valves allow a discharge of fluid if the brake pressure on the wheel brake should be too high and the wheel threatens to lock.

For regulating the brake pressure an actuatable pressure generator, which is connected by its suction side to a return from the wheel brakes controlled by the pressure reduction valve, is furthermore provided on the hydraulic unit. Fluid is transported away from the wheel brakes via the pressure reduction valve. A delivery side of the pressure generator is connected to an inlet of the wheel brake controlled by the pressure build-up valve. For controlling the flow of fluid through the pressure generator the latter is fitted with a pump inlet valve on the suction side and with a pump discharge valve on the delivery side.

The brake master cylinder of the vehicle brake system is moreover connected to the delivery side of the pressure generator. Consequently, when the brake master cylinder is actuated the increased brake pressure acts on the delivery side of the pressure generator, thereby making it more difficult to start. This occurs particularly in ABS braking sequences, in which the brake pressure is generated by the driver and in which the pressure generator starts up in order to regulate the brake pressure. In order to allow the pressure generator to start up despite the prevailing counter-pressure, its drive is designed to afford commensurate power, but on the other hand is of relatively large and heavy construction.

New system functions, such as pedestrian safeguards, for example, exacerbate the problem explained above. They require an especially rapid build-up of brake pressure on the wheel brakes and assume that ever greater volumes of fluid can be fed to the wheel brakes in ever shorter times. An adaptation of the pressure generator designed to cater for this need means that the design performance of its drive has to be increased yet further, therefore once again making it larger and heavier. Compact dimensions and a low weight, however, are fundamental requirements in vehicle manufacturing.

SUMMARY

A subject matter according to the disclosure on the other hand has the advantage that it manages with a drive of particularly compact and lightweight construction, although the pressure generator is capable of delivering a large volume of fluid particularly rapidly. The starting current of the drive of the pressure generator is low compared to conventional designs, because the provision of suitable means downstream of the pump discharge valve ensures that, immediately on starting the pressure generator, at least, the high pressure level of the brake master cylinder no longer acts on the pump delivery side, and as a result does not inhibit the starting of the pressure generator.

Further advantages and advantageous developments of the disclosure emerge from the dependent claims and/or the following description.

Suitable means are, in particular, non-return valves, which allow a flow to pass in the delivery direction of the pressure generator and which close in the opposite direction. Fluid-actuated non-return valves without springs, which comprise a valve seat and a valve closing member controlling this valve seat, are preferably used owing to their simple, inexpensive construction and their trouble-free operation. The valve closing member may take the form of a ball or a valve plate. Such non-return valves may form one standard unit together with the pressure generator and at no additional cost can then be fixed together with the latter to a building block of a hydraulic unit of the vehicle brake system.

If a conventional reciprocating piston pump is used as pressure generator, this may be provided with a pulsation damping device for damping pressure pulses, which can be arranged between the pump discharge valve and the non-return valve in the direction of flow. Pulsation damping devices comprise a damping chamber of variable volume (so-called C element) and a restrictor (so-called. R element) arranged downstream of the former. The volume of the damping chamber is ideally matched to the volumetric delivery of the reciprocating piston pump, in such a way that the damping chamber is capable of receiving as least the volume of fluid from one discharge stroke of the reciprocating piston pump. This design ensures that the reciprocating piston pump delivers at least the volume of its first discharge stroke into the damping chamber, so that immediately on commencing delivery of the fluid, at least, the pump drive is not operating against the pressure of the brake master cylinder, and the drive has a correspondingly lower starting current. Once the pressure generator has started up, it is also possible to deliver fluid in opposition to the pressure of the brake master cylinder with a significantly lower electrical load than would be possible when starting under a counter-pressure. Ultimately, therefore, a lighter, more cost-effective pump drive of more compact construction can be used.

BRIEF DESCRIPTION OF THE DRAWINGS

An exemplary embodiment of the disclosure is represented in the drawings and explained in detail in the following description. The figures show.

DETAILED DESCRIPTION

Figure 1:
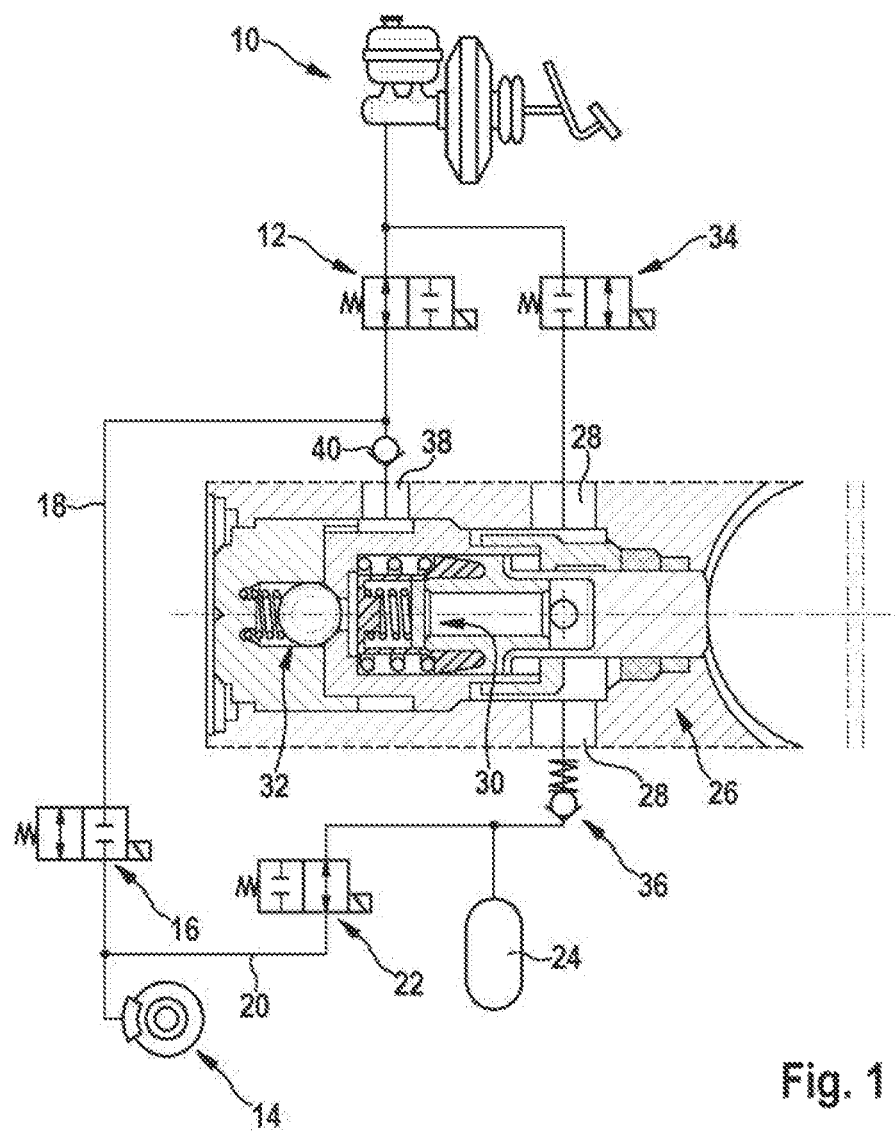
FIG. 1: the hydraulic circuit diagram of a brake circuit of a vehicle brake system with wheel slip control, modified according to the disclosure.

Using circuit symbols, the hydraulic circuit diagram represented in FIG. 1 shows a brake circuit of a vehicle brake system with wheel slip control, substantial parts of which are known. Among other things, this brake circuit comprises a brake master cylinder 10 actuated physically by the driver. A connection of the brake circuit to the brake master cylinder 10 can be controlled by way of a switch-over valve 12. The switch-over valve 12 is open in its basic position and, actuated by a solenoid, can be switched into a closed position. In the closed position of the switch-over valve 12 the driver is unable to vary the brake pressure on a wheel brake 14 connected to the brake circuit.

The brake circuit branches off downstream of the switch-over valve 12. A line branch leads via a pressure build-up valve 16, in the form of a normally open 2/2-way directional control valve, to the wheel brake 14 and thereby forms the inlet 18 to the wheel brake.

A return 20 from the inlet 18 branches off immediately upstream of the connection of the wheel brake 14. This return 20 is controlled by a pressure reduction valve 22, which is normally closed and can be switched electromagnetically into an open position. With the return 20 open, fluid is able to flow out of the wheel brake 14 in the direction of a buffer accumulator 24, in order to reduce the brake pressure on the wheel brake 14. It is also feasible to dispense with the buffer accumulator 24 and to connect the return directly to the suction side of an externally driven pressure generator 26.

The pressure generator 26 represented is a reciprocating piston pump, the suction side 28 of which is controlled by a pump inlet valve 30 embodied as a non-return valve and accommodated inside the reciprocating piston pump. A delivery side 38 of the reciprocating piston pump is controlled by a pump discharge valve 32, which is likewise embodied as a non-return valve and is arranged inside the pressure generator 26. Downstream of the switch-over valve 12 and upstream of the pressure build-up valve 16 the reciprocating piston pump is connected by its delivery side 38 to the brake circuit. The pump discharge valve 32 here prevents fluid flowing out of the brake circuit back into the interior of the pressure generator 26.

In addition to the wheel brake 14, the brake master cylinder 10 of the vehicle brake system is connected to the suction side 28 of the pressure generator 26. This connection is controlled by a high-pressure switch valve 34, which is normally closed and which, actuated by a solenoid, can be switched over to an open position. The pressure generator 26 is able to suck fluid directly out of the brake master cylinder 10 via the high-pressure switch valve 34, if the quantity of fluid held by the buffer accumulator 24 should be insufficient for a necessary build-up of brake pressure in the brake circuit.

Since it can happen, when the switch-over valve 12 is closed, that the pressure in the fluid connection from the high-pressure switch valve 34 to the suction side 28 of the pressure generator 26 is higher than in the return 20 of the wheel brake 14, an additional check valve 36 is arranged upstream of the buffer accumulator 24. This prevents fluid flowing into the buffer accumulator 24 out of the fluid connection from the high-pressure switch valve 34 to the suction side of the pressure generator 26. For this purpose, the check valve 36 is designed to allow a flow in the direction from the wheel brake 14 to the suction side 28 of the pressure generator 26, and closes in the opposite direction.

In braking sequences with antilock brake control (ABS braking sequences), the brake pressure is generated by the driver actuating the brake pedal of the brake master cylinder 10 and is relayed by the switch-over valve 12, situated in the open position, to the likewise opened pressure build-up valve 16 and the wheel brake 14 on the output side. The increased brake pressure consequently prevails also on a delivery side of the pressure generator 26 and on the pump discharge valve 32.

If the brake pressure on the wheel brake 14 now needs to be reduced, for example because the associated wheel threatens to lock, the pressure reduction valve 22 assigned to the wheel brake 14 is switched to open and the pressure generator 26 is powered in order to suck in the fluid flowing into buffer accumulator 24, and to store this at increased pressure on the pressure build-up valve 16, now assuming its closed position, for any subsequent build-up in brake pressure. Here the high pressure level on the delivery side 38 of the pressure generator 26 makes it more difficult to start the latter, because to a certain extent it has to contend with the prevailing high pressure from the brake master cylinder 10. The starting current on the drive of the pressure generator 26 consequently rises, which necessitates a correspondingly adapted drive design. This effect is further intensified by current system requirements concerning the volume of fluid that can be delivered by the pressure generator 26 per unit time. This volume of fluid should be as large as possible in order to build up a high brake pressure in the wheel brake 14 in the shortest possible time, in order to mitigate or even prevent impending collisions with other road users, especially pedestrians.

In order to ensure that the pressure generator 26 will start despite the prevailing counter-pressure on its delivery side 38, according to the disclosure means 40 are provided, which prevent the pressure of the brake master cylinder 10 acting on the delivery side 38 of the pressure generator 26. These means 40 are preferably a non-return valve arranged downstream of the pump discharge valve 32 in the direction of flow, which allows a flow in the delivery direction of the pressure generator 26 and which closes in the opposite direction to this delivery direction. Such a non-return valve may be of an especially simple and robust embodiment, for example as a valve without springs, having a pressure-actuated valve closing member and a valve seat controlled by the valve closing member. Balls or valve plates may equally be used as valve closing member, whereas the valve seat may be embodied as a flat seat, as a conical seat or one of spherical design. The representation of the non-return valve in FIG. 1 is to be interpreted purely schematically in this respect. The valve closing member is pressed against the associated valve seat by the pressure of the brake master cylinder 10 and prevents this pressure extending to the pump discharge valve 32.

A pulsation damping device 42 may be arranged in the area of the line between the pump discharge valve 32 and the means 40 according to the disclosure, in order to damp pressure pulses, which occur particularly in pressure generators in the form of reciprocating piston pumps due to their cyclical working principle. The basic construction of such pulsation damping devices 42 is disclosed in FIG. 2; FIG. 1, for the sake of simplicity, represents the pressure generator 26 without such a pulsation damping device.

Figure 2:
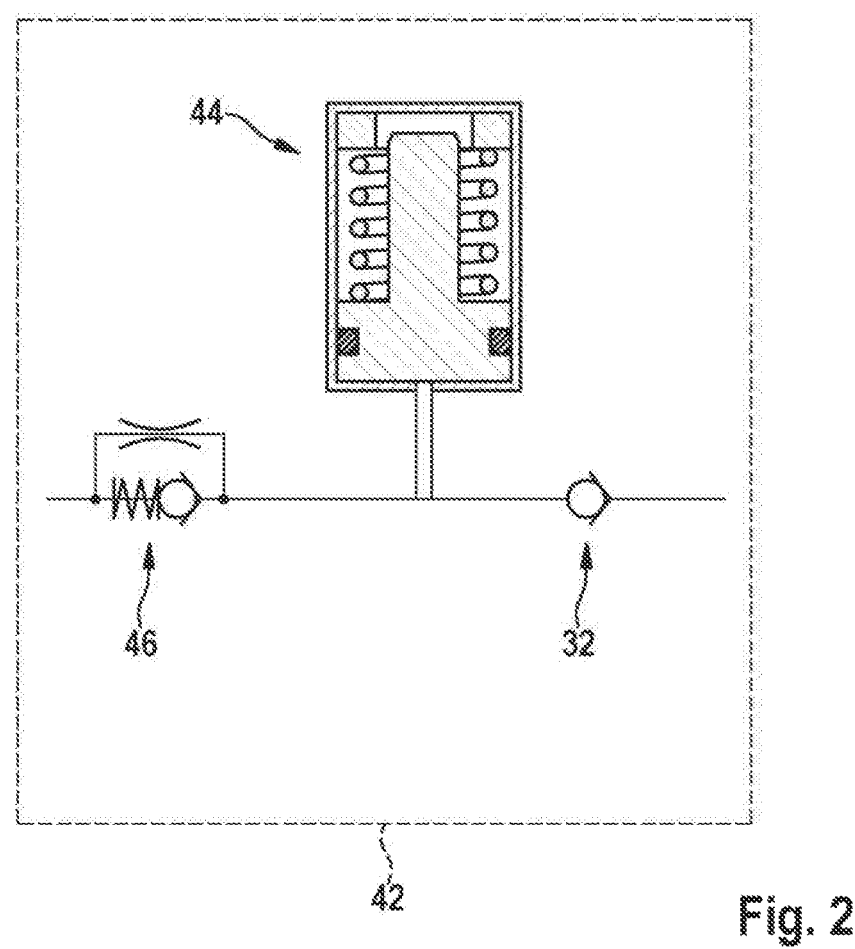
FIG. 2: the hydraulic circuit diagram of a pulsation damping device for damping pressure pulses on the delivery side of a pressure generator embodied in the form of a reciprocating piston pump.

The pulsation damping device 42 according to FIG. 2 is arranged downstream of the pump discharge valve 32 and comprises a pulsation damper 44 of variable volume according to the pressure, also referred to as a C element, and a restrictor 46, arranged downstream of this pulsation damper 44 and referred as an R element. The pulsation damper 44 comprises at least one elastically deformable or displaceable wall, which may be formed from a diaphragm, a hollow bellows or a sprung piston, for example, as shown in FIG. 2. The restrictor 46 arranged downstream of the pulsation damper 44 may be embodied as fixed restrictor having a constant flow cross section or as a dynamic restrictor having a flow cross section capable of varying as a function of the pressure. Through suitable choice of the elasticity of the wall, of the bellows or of the return force of an elastic element, in the form of a spring acting in opposition to a displacement of the piston, the volumetric capacity of the pulsation damper is matched to the volumetric delivery of the pressure generator 26, in such a way that the pulsation damper 44 can receive at least the volume of a single discharge stroke, that is to say the first discharge stoke as the pressure generator 26 starts up. With such dimensioning of the pulsation damper 44 the starting of the pressure generator 26 can be ensured and the starting current of the drive can be reduced compared to a vehicle brake system of conventional design. This in turn allows an optimization of the external dimensions, weight and costs of the drive of the pressure generator 26, without having to accept reductions in the volumetric delivery of the pressure generator 26 per unit time.

After successfully starting the pressure generator 26, currents which are lower still than the starting current of the drive of a vehicle brake system according to the disclosure are sufficient to keep the pressure generator in operation.

Modifications or additions to the exemplary embodiment described are obviously possible without departing from the basic idea of the disclosure.

It should be mentioned in this context that the vehicle brake system described is a vehicle brake system having wheel slip control with antilock braking, traction control and driving dynamics control. The disclosure is also equally applicable, however, to vehicle brake systems equipped only with antilock braking. As is well known, the brake circuits of such vehicle brake systems do not comprise switch-over valves 10 or high-pressure switch valves 34, for example, but in other respects they correspond to the embodiment described and represented in FIG. 1.

The invention claimed is:

1. A vehicle brake system with wheel slip control, comprising:
   a drivable pressure generator configured to supply at least one wheel brake with fluid,
   wherein the pressure generator is connected by a suction side of the pressure generator to a return from the wheel brake controlled by a pressure reduction valve and by a delivery side of the pressure generator to an inlet of the wheel brake controlled by a pressure build-up valve and connected to an actuatable brake master cylinder of the vehicle brake system,
   wherein the pressure generator includes at least one pump inlet valve and at least one pump discharge valve to control the fluid rate of flow, and
   wherein a mechanism is provided downstream of the pump discharge valve to prevent the pressure of the brake master cylinder acting on the delivery side of the pressure generator.

2. The vehicle brake system with wheel slip control as claimed in claim 1, wherein the mechanism includes a non-return valve that allows a flow to pass in the delivery direction of the pressure generator and that closes in the opposite direction to the delivery direction of the pressure generator.

3. The vehicle brake system with wheel slip control as claimed in claim 2, wherein the non-return valve is a valve without springs having a pressure-loaded valve closing member and a valve seat controlled by the valve closing member.

4. The vehicle brake system with wheel slip control as claimed in claim 3, wherein the valve closing member is configured as a ball or as a valve plate.

5. The vehicle brake system with wheel slip control as claimed in claim 1, wherein the pressure generator and the mechanism are combined to form one standard unit.

6. The vehicle brake system with wheel slip control as claimed in claim 1, wherein the pressure generator is a reciprocating piston pump that is equipped with a pulsation damping device, and wherein the pulsation damping device is arranged downstream of the pump discharge valve and upstream of the mechanism.

7. The vehicle brake system with wheel slip control as claimed in claim 6, wherein the pulsation damping device comprises a pulsation damper of a volume configured to vary as a function of the pressure and a restrictor, and wherein the pulsation damper receives at least the volumetric delivery of the pressure generator during a discharge stroke.

8. The vehicle brake system with wheel slip control as claimed in claim 7, wherein the pulsation damper of the pulsation damping device comprises at least one elastically deformable diaphragm or an elastically deformable bellows or a piston moveable against the force of an elastic element.

9. The vehicle brake system with wheel slip control as claimed in claim 8, wherein the elastic element is a spring.

10. A vehicle brake system with wheel slip control, comprising:
    a drivable pressure generator configured to supply at least one wheel brake with fluid, the pressure generator including:
       a suction side connected to a return from the wheel brake by a first line, flow through which is controlled by a pressure reduction valve;
       a delivery side connected to (i) an inlet of the wheel brake by a second line, flow through which is controlled by a pressure build-up valve, and (ii) an actuatable brake master cylinder of the vehicle brake system;
    at least one pump inlet valve; and
    at least one pump discharge valve, the at least one pump inlet valve and the at least one pump discharge valve controlling a fluid flow rate from the suction side to the delivery side; and
    a mechanism provided downstream of the pump discharge valve and configured to prevent a pressure of the brake master cylinder from acting on the delivery side of the pressure generator.

11. The vehicle brake system with wheel slip control as claimed in claim 10, wherein the mechanism includes a non-return valve that allows flow in a delivery direction of the pressure generator and that closes in a direction opposite to the delivery direction of the pressure generator.

12. The vehicle brake system with wheel slip control as claimed in claim 11, wherein the non-return valve does not include any springs, and the non-return valve has a valve closing member loaded by a downstream pressure towards a valve seat, flow through the non-return valve being controlled by the valve closing member.

13. The vehicle brake system with wheel slip control as claimed in claim 12, wherein the valve closing member is a ball or a valve plate.

14. The vehicle brake system with wheel slip control as claimed in claim 10, wherein the pressure generator and the mechanism are combined to form one standard unit.

15. The vehicle brake system with wheel slip control as claimed in claim 10, wherein the pressure generator is a reciprocating piston pump that includes a pulsation damping device arranged downstream of the pump discharge valve and upstream of the mechanism.

16. The vehicle brake system with wheel slip control as claimed in claim 15, the pulsation damping device comprising:
   a pulsation damper; and
   a restrictor positioned downstream of the pulsation damper,
   wherein the pulsation damper has a volume that varies as a function of a pressure at the delivery side and the restrictor, and
   wherein the pulsation damper is configured to receive at least a full volumetric delivery quantity produced by the pressure generator during a discharge stroke.

17. The vehicle brake system with wheel slip control as claimed in claim 16, wherein the pulsation damper of the pulsation damping device comprises at least one of an elastically deformable diaphragm, an elastically deformable bellows, and a piston moveable against an elastic force of an elastic element.

18. The vehicle brake system with wheel slip control as claimed in claim 17, wherein the elastic element is a spring.

\* \* \* \* \*